United States Patent

Roeschlein

[15] 3,700,780

[45] Oct. 24, 1972

[54] DUAL DELAYED SEQUENCE GENERATOR WITH READ ONLY MEMORY CONTROL FOR 256 OUTPUT TRIPLES FOR PLANE AND SPHERICAL WAVE-FRONT SIMULATIONS

[72] Inventor: Eugene R. Roeschlein, Indianapolis, Ind.

[73] Assignee: The United States of America as represented by the Secretary of the Navy

[22] Filed: May 4, 1971

[21] Appl. No.: 140,167

[52] U.S. Cl. .................................... 35/10.4, 340/5 C
[51] Int. Cl. ............................................... G09b 9/00
[58] Field of Search ......................... 35/10.4; 340/5 C

[56] References Cited

UNITED STATES PATENTS 3,484,738 12/1969 Autrey ..................... 35/10.4 X
3,641,485 2/1972 Murphree et al. ....... 35/10.4 X

*Primary Examiner*—T. H. Tubbesing
*Attorney*—R. S. Sciascia and H. H. Losche

[57] ABSTRACT

A dual delayed sequence digital generator having a plurality of shift register modules connected to generate linear sequences, each module stage having an output to a solid state switch under the control of a read only memory (ROM) circuit to switch the shift register outputs to a combination of OR gates operating in a modulo-2 manner to sift all shift register outputs to a single digital output through a filter, limiter and buffer, the combination of similar circuits providing a plurality of delayed signals simulating a sonar signal wavefront from a simulated target in inner space.

8 Claims, 1 Drawing Figure

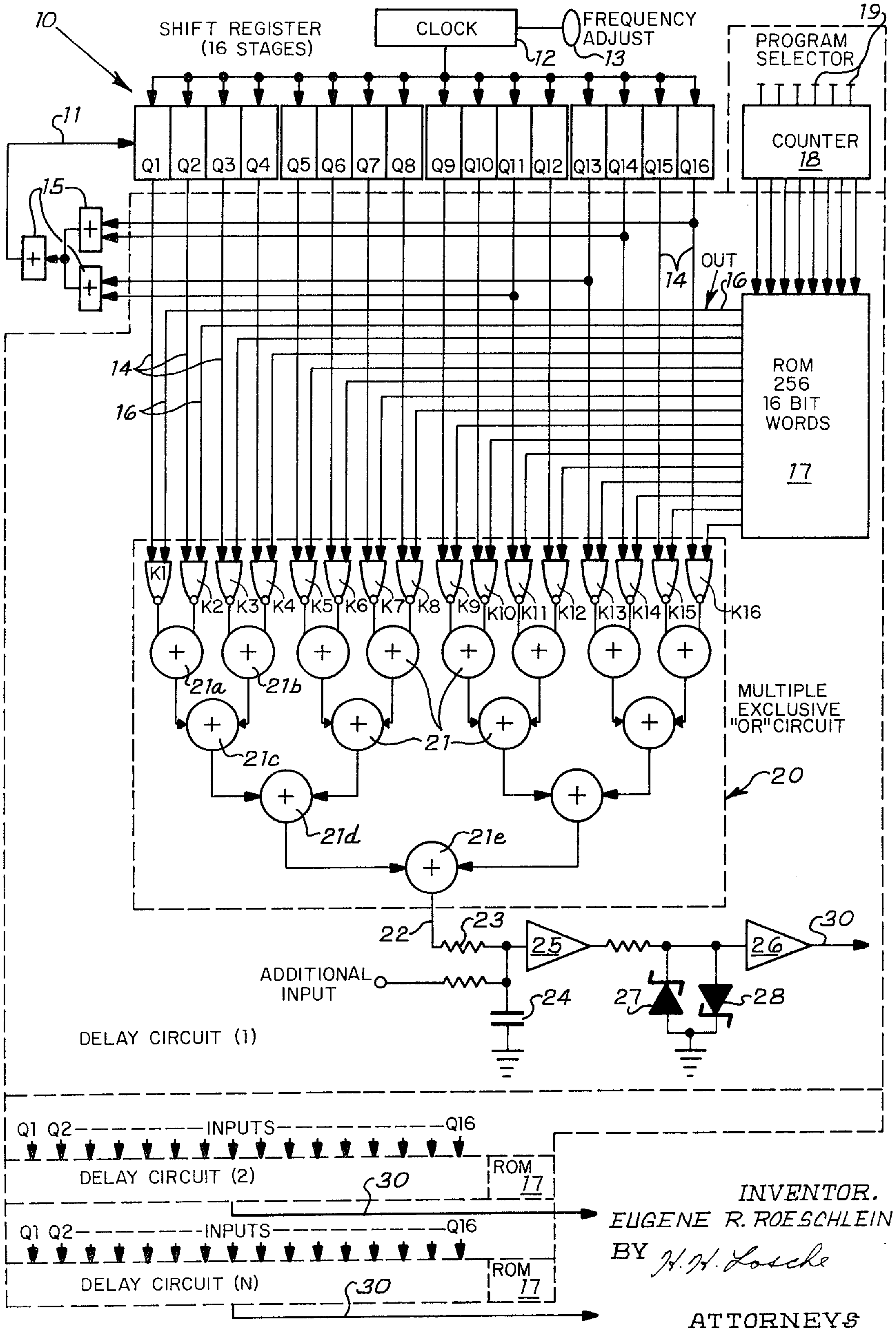
INVENTOR.
EUGENE R. ROESCHLEIN
BY H. H. Losche
ATTORNEYS

DUAL DELAYED SEQUENCE GENERATOR WITH READ ONLY MEMORY CONTROL FOR 256 OUTPUT TRIPLES FOR PLANE AND SPHERICAL WAVE-FRONT SIMULATIONS

STATEMENT OF GOVERNMENT INTEREST

The invention described herein may be manufactured and used by or for the Government of the Unites States of America for governmental purposes without the payment of any royalties thereon for therefor.

BACKGROUND OF THE INVENTION

This invention relates to a digital bit sequence generator and more particularly to a sequence generator with a ROM controlled digital bit selector and a modulo-2 OR gate combination to twice delay and reduce the digital bit sequence on an output to test a sonar receiver in operation by delayed signals representative of a simulated target position.

Prior methods made use of diode noise generators and LC delay lines which did not have the desired accuracy, and the switching to the different desired delays was accomplished with manual switches. This method or means provided an analog system of producing sonar wavefronts which would deviate from the intended test input in accordance with generator and LC delay line changes in frequency or delay occasioned by temperature or ambient atmospheric or environmental changes. These inaccuracies would have to be adjusted or calibrated out.

SUMMARY OF THE INVENTION

In the present invention the means provides an all digital crystal controlled generator of extreme accuracy, having no adjustments, and suitable for rapid, automatic testing. A clock driven shift register having a feedback of chosen digital outputs provides a first or original sequence that is fed through switches or NAND gates under the control of a ROM to select certain of the sequence of digital bits thus determining the amount of a second delay, which delayed bits are passed through OR gates in a modulo-2 manner to sift the delayed signals down to a single output, similar circuits being placed in parallel connection to the original register to provide a plurality of single bit outputs of different delays to simulate a received sonar wavefront from a simulated target relative to the sonar receiver. Accordingly, it is an object of this invention to provide a plurality of digital bit sequences of various delays to simulate the reception of sonar signals from a target in inner space, which signals are received on a plurality of simulated sonar transducer microphones to establish a time sequence in triangulation to the target establishing a sonar target wavefront to position such target in the inner space.

BRIEF DESCRIPTION OF THE DRAWING

These and other objects and the attendant advantages, features and uses will become more apparent to those skilled in the art as a more detailed description proceeds when taken along with the accompanying drawing having a FIGURE illustrating in circuit schematic and block diagram with arrows on conductors showing the direction of information.

DESCRIPTION OF THE PREFERRED EMBODIMENT

Referring more particularly to the drawing, a shift register 10 consisting of 16 stages whose outputs are identified by Q1 through Q16 are arranged from 4 shift register flatpacs, which flatpacs are available on the open market by Fairchild No. 9300, or any other equivalent flatpacs. The shift register is coupled in serial relation with an input 11 to the first stage of the shift register to serially shift all input pulses on the input 11 through the register to the last stage of said register. The shift register 10 has all stages driven in parallel by a clock pulse source 12 which provides an accurate fixed frequency although this frequency may be adjusted, as illustrated by the manual wheel 13 for the purpose as will later become clear. The register outputs from Q11, Q13, Q14, and Q16, are fed back through an exclusive OR circuit consisting of three exclusive OR units 15. That is; Q11 and Q13 outputs are coupled to one exclusive OR network while Q14 and Q16 outputs are coupled to another exclusive OR network, the outputs of these two exclusive OR networks being coupled to a third exclusive OR network producing a single output 11 constituting the input to the first stage Q1 of the shift register. This causes the register to cycle through 65,535 states ($2^N-1$, where N = 16 in this example). This linear sequence of 65,535 bits appears at outputs Q1-Q16 as the clock shift pulses are applied to the register 10.

The 16 outputs 14 of the shift register stages are coupled respectively as one input to each switch gate K1 through K16 leading to a multiple input exclusive OR circuit 20. A second input 16 is applied to each K switch from a ROM circuit 17 providing 256, 16 bit words to the switch gates K1 through K16. The ROM circuit is controlled by inputs from a counter circuit 18 which counter circuit is programmed, as shown illustrated by keys 19 herein, from a program selector although the counter 18 will normally be programmed by a program card, tape, or other memory means, as is well understood of programming such circuits by those skilled in the art. By choosing the outputs 14 from the shift register 10 to the feedback through the exclusive OR gates 15, the first delay may be produced on the outputs 14 to the switch gates K1 through K16. By various programs placed in the program selector 19 to the counter circuit controlling the 256, 16 bit word ROM outputs to the switch gates K1 through K16, 256 separate delays may be instituted into the circuit. The K1 through K16 control inputs 16 can alternatively be controlled from other control media such as punched paper tape or magnetic tape and such inputs can be stored in latch circuits so that numerous delays can be held and replaced in groups.

The multiple exclusive OR circuit 20 includes paired OR gates 21 on the outputs of each two switch gates such as K1,K2 to exclusive OR gates 21a, K3 and K4 as inputs to exclusive OR gate 21*b*, etc., through the outputs of K15 and K16. Each pair of exclusive OR gates, such as 21*a* and 21*b*, provides inputs to exclusive OR gate 21*c*, the output of which is to exclusive OR gate 21*d*, the output of which is to 21*e*, thereby sifting all digital output information from the switch gates K1 through K16 through the final exclusive OR gate 21*e* to produce a single digital output on 22 of the delay circuit (1). The multiple exclusive OR circuit 20, including the switch gates K and exclusive OR gates 21, are integrated circuits which may be purchased in flatpacs on the open market sold by Fairchild under the number 9014 (exclusive OR circuits) and by Sylvania under number SG320 (NAND gates) or by other manufactures having equivalent circuits. The output 22 is passed through a low pass filter consisting of a resistor 23 and a capacitor 24 and/or other circuit components to filter out higher frequencies of the digital output. The filtered output 22,23,24 is amplified in amplifier 25 and passed through a limiter circuit provided by a pair of inversely connected Zener diodes 27 and 28 to a fixed potential, such as ground, which limits the digital pulses in both the positive and negative direction and the output is a binary sequence of lower frequency content than 22. The limiter 27,28 could be eliminated to provide a linear voltage output. The output of delay circuit (1) is through a buffer amplifier 26 to isolate the delayed circuit from the output 30. This delayed sequence and the sequence present in the shift register 10 form a dual delay arrangement and other delays can be similarly formed all referenced to the original sequence and thus to each other, the whole group constituting a wavefront simulation.

The delay circuit (1) consists of the counter circuit 18, the ROM circuit 17, and the multiple exclusive OR circuit 20, filter 23,24, limiter 27,28, and buffer 26 which are duplicated and repeated in delay circuit (2) through delay circuit (N) to provide as many as 50 to 100 or any desired number to establish a wavefront of a target object as will hereinafter be made clear in the description of operation.

OPERATION

In the operation of the device shown in the figure of drawing the program selected is chosen as by card, tape or other memory means to produce counter 18 outputs to the ROM circuit 17 along with the selection of the feedback from the Q1 through Q16 outputs to establish first and second delays in the signals fed into the shift register by input 11 to establish a particular delay on the output 22 respectively of the delay simulating a sonar sounding reflected back from a target to a single sonar microphone. Every other delay circuit (2) through (N) is likewise programmed and the feedback selection provided to establish various delays to produce various delayed digital pulse outputs on all outputs 30 respectively of the sonar sounding reflected from a simulated target back to various simulated sonar receivers to establish a wavefront as though coming from a target in inner space. All of the outputs 30 are for the purpose of application to a sonar receiver simulating test signals representative of this wavefront to test the operation of the sonar receiver. Additionally these delays can be increased or decreased by a ratio (linearly) with a change in the crystal clock 12 frequency by adjusting 13 to simulate different sound velocities. The outputs 30 can be made linear by omitting the Zener diode limiter 27,28 and the low pass filter 23,24 can be replaced by other spectrum shaping filter means to more closely simulate desired target emissions. By changing the programs in the program selector 19, plane and spherical wavefront type signals from simulated target position to hydrophones arranged in any spatial way can be provided. The accuracy of the test circuit is entirely dependent on the crystal clock, by the use of all digital control, and by digital processes and generation thereby avoiding the inaccuracies of resistance-inductance-capacitance type circuit components. This test circuit provides signal sequences of very long and continuous lengths as determined by the clock 12 frequency by the number of the shift register stages in the shift register 10. This circuit has the advantage of having a very rapid and convenient control of simulated target position with ROM storage and digital control. This invention can also provide multiple target generation with summing signal conditioner means. This circuit has the advantage of providing partially uncorrelated outputs for confused and extended targets by setting in "incorrect" delays. One system test can be of a "no target" noise by setting in delays in excess of correlation range of the system. The outputs of this delay circuit 30 have an extremely sharp correlation function with respect to each other output and this is characteristic of the linear sequences used, and provide an optimum test signal group. Analog or digital outputs of the desired bandwidth and spectral density can be provided by a choice of the output signal conditioning means used such as changes in the filter circuit 23,24 and limiter circuit 27,28. One advantage of this test circuit is based on the well known properties of PN linear sequences and their "shift and add" properties of generating a new sequence from the original, like the original, but delayed in time. All clock period delays up to the $2^N-1$ can be attained. Different sound velocities can be simulated, as hereinbefore stated, by altering the clock frequency without any change in the switch program of the program selector. Accordingly, a sonar receiver can be tested for various linear and circular simulated wavefronts under conditions of different simulated sound wave velocities to determine the correctness of operation of the sonar receiver.

While many modifications and changes may be made by the selection of different flatpacs than herein identified and by different means of program selection, it is to be understood that I desire to be limited in the spirit of my invention only by the scope of the appended claims.

I claim:

1. A dual delayed sequence generator for producing different sonar wavefront simulations comprising:

a shift register of a plurality of multibit flatpac stages, each stage having an output with a predetermined combination of stage outputs coupled through exclusive OR gates to the first stage input as a feedback to establish a predetermined linear sequence of bits through said shift register providing an original sequence or reference delay on said stage outputs;

a clock pulse source coupled in common to said shift register stages to drive same to shift the feedback input therethrough;

a NAND gate switch coupled one each to one each shift register stage output, each gate switch having a gating input and an output;

a read only memory having a plurality of outputs, one each output being coupled to one each NAND gate switch gating input, and said read only memory having a plurality of control inputs;

a counter circuit having a plurality of outputs coupling said plurality of inputs of said read only memory, combinations of said counter circuit outputs being selectable to produce selected outputs of said read only memory to produce selected outputs from said NAND gate switches to select and gate through the aforementioned linear sequence as it appears at the various shift register stage outputs;

a multiple exclusive OR circuit with the NAND gate switch outputs coupled to a modulo-2 manner through the circuit to a single output to reproduce the sequence of said shift register to any desired delay with respect to the reference sequence of the original shift register and thus to simulate a sonar signal received from one sonar microphone, said NAND gate switches, read only memory, and multiple exclusive OR circuit being repeated in modular form and coupled to said original shift register and counter circuit to simulate sonar signals received at other sonar microphones with different time delays to simulate wavefronts from a target to position same; and a signal conditioner coupled to said multiple exclusive OR circuit output to provide spectral shaping of these delayed signals and the combination of said repeated circuits provides simulated signals from a plurality of simulated sonar receiver microphones to establish a simulated wavefront from a simulated target object in inner space.

2. A dual delayed sequence generator as set forth in claim 1 wherein said counter circuit outputs are selectable from a plurality of programs to program said read only memory to establish different combinations of gating signals to said NAND gate switches to establish different sonar wavefronts fixing different simulated target positions.

3. A dual delayed sequence generator as set forth in claim 2 wherein said clock pulse source is adjustable in frequency to increase and decrease signal delays corresponding to different sound velocities in water.

4. A dual delayed sequence generator as set forth in claim 3 wherein said predetermined combination of stage outputs from said shift register consists of four stage outputs in two pairs of two each, each pair being coupled to one of said exclusive OR gates and the outputs of both pairs of exclusive OR gates being coupled to a third exclusive OR gate, the output thereof being said feedback into said first stage, thus generating the original or reference linear sequence.

5. A dual delayed sequence generator as set forth in claim 4 wherein said shift register consists of a plurality of multiple stages, each stage having a plurality of bit counts providing a shift register of $2^N-1$ sequence states, where N is the number of multiple stages, and the number of outputs of said read only memory and the number of NAND gate switches correspond to this number N.

6. A dual delayed sequence generator as set forth in claim 5 wherein said signal conditioner includes a filter to control the spectral density of the output signal, a limiter to convert the output signals to the desired digital bandwidth, and a buffer amplifier to enable the signal output to drive a signal load.

7. A dual delayed sequence generator as set forth in claim 6 wherein said signal conditioner includes multiple inputs to permit additional similarly generated simulated targets and an input from noise generators to provide for noise to be added for various signal to noise ratios of these simulated targets.

8. A dual delayed sequence generator as set forth in claim 7 wherein said target simulation may be made to cyclically move through a predetermined path relative to own ship motion and this may be extended to simulate a number of targets simultaneously in motion.

* * * * *